United States Patent [19]
Gagnon et al.

[11] 4,242,250
[45] Dec. 30, 1980

[54] ORGANOPOLYSILOXANE RESINS FORMED WITH CATALYSTS OF FORMIC ACID AND HYDROCARBYL SUBSTITUTED AMMONIUM HYDROXIDE

[75] Inventors: Donald W. Gagnon, Sylvania; James J. Tillman, Toledo, both of Ohio

[73] Assignee: Owens-Illinois, Inc., Toledo, Ohio

[21] Appl. No.: 51,488

[22] Filed: Jun. 25, 1979

[51] Int. Cl.$^3$ ................................. C08K 5/05
[52] U.S. Cl. .................. 260/33.4 SB; 260/33.6 SB; 528/12; 528/21; 528/43; 427/387; 428/412; 428/429; 428/447
[58] Field of Search ............................ 528/12, 21, 43; 260/33.4 SB, 33.6 SB; 427/387; 428/412, 429, 447

[56] References Cited

U.S. PATENT DOCUMENTS

| | | | |
|---|---|---|---|
| 3,433,764 | 3/1969 | Walmsley | 528/21 |
| 3,457,221 | 7/1969 | Stengle, Jr. | 260/37 SB |

Primary Examiner—Melvyn I. Marquis
Attorney, Agent, or Firm—David R. Birchall; Myron E. Click; David H. Wilson

[57] ABSTRACT

A process for forming organopolysiloxanes from trialkoxysilanes and the resulting resinous products are disclosed, characterized in that the organopolysiloxane resins have increased abrasion and solvent resistance with good shelf life. The organopolysiloxanes are formed by dual catalysts that operate preferably in sequence. Hydrolysis and condensation of the trialkoxysilanes are carried out in an aqueous solution and catalyzed by formic acid at a relatively high strength, such as an amount greater than 700 ppm. Cross-linking of the resulting partially condensed, curable organopolysiloxane is then catalyzed by a hydrocarbyl substituted ammonium hydroxide in which the hydrocarbyl substituent may be alkyl or alkenyl up to about 6 carbon atoms. The resinous products are especially useful as coating compositions.

32 Claims, No Drawings

ORGANOPOLYSILOXANE RESINS FORMED WITH CATALYSTS OF FORMIC ACID AND HYDROCARBYL SUBSTITUTED AMMONIUM HYDROXIDE

CROSS-REFERENCE TO RELATED APPLICATION

U.S. patent application, Ser. No. 966,421, filed Dec. 4, 1978 in the name of Alfred J. Bruzynski, discloses and claims the use of formic acid in the hydrolysis and condensation of silanes to organopolysiloxanes. The previously filed application and the present application have a common assignee.

BACKGROUND OF THE INVENTION

Hydrolysis-condensation products of trialkoxysilanes, such as of methyltrialkoxysilanes, are of commercial interest, because such products possess several properties unique among organopolysiloxanes. Since, for example, such products have no carbon-to-carbon bonds, they transmit well ultraviolet radiation, and of all organopolysiloxanes they contain a relatively high proportion of inorganic constituents.

However, it is extremely difficult to control the hydrolysis and condensation rates of organotrialkoxysilanes. Most silanols, that is, silicon compounds which posses one or more hydroxyl groups bonded directly to a silicon atom, tend to form the corresponding ether analogs (siloxanes) by an equilibrium reaction that may be regarded as the loss of one molecule of water per two such hydroxyl groups. The reactivity of silanols, especially silanetriols, to form siloxanes is so great that selectivity in product formation is seldom possible, and complexity of the reaction mixture often precludes identification of specific products.

The high activity of most silanols makes it desirable to form them in situ. This is usually accomplished by hydrolysis of precursors which contain silicon atoms attached to substitutents convertible to hydoxyl groups. These hydrolysis reactions may be illustrated as

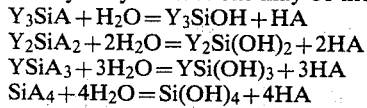

in which Y represents, for example, an organic group such as hydrocarbon radical, and A represents a hydrolyzable group such as alkoxy, acyloxy, halogen, etc.

It is known that a acid medium catalyzes hydrolysis and siloxane formation in the types of reactions just described. It was previously thought that control of the reaction conditions and particularly of the acid pH condition was an absolute necessity to prevent an uncontrollable reaction, such as premature gelation. The acute sensitivity of silanetriols, such as methyl silanetriol, to acid catalysis in general precluded the use, as precursors, of methyltrichlorosilane, methyltriacetoxysilane, and similar derivitives which liberate acid by-products during hydrolysis. As a result attention has been directed mainly to trialkoxysilanes such as methyltrialkoxysilane.

Accordingly, prior research relating to the hydrolysis-condensation of trialkoxysilanes to organopolysiloxanes has concentrated on the amount of acid or type of catalyst used. To avoid gelation and effect hydrolysis and polysiloxane formation at a conveniently rapid and controllable rate, the amount of acid catalyst used, such as hydrochloric acid, was previously fairly carefully regulated. A slight deviation from a prescribed amount, such as from inadvertent mistake, could cause large variations in the polymer produced. The reactions of hydrolysis and condensation are normally so fast and sensitive that they could not be easily controlled.

U.S. Pat. No. 3,389,114 to Burzynski and Martin discloses using a reaction mixture of a methytrialkoxysilane and from 0 to about 700 parts of acid, as an upper limit, expressed as HCl, per million parts of total silane reactant material and water. This disclosure is limited to methyltrialkoxysilanes in which the alkyl group has less than four carbon atoms, since the system is regarded as even more sensitive to other alkyltrialkoxysilanes.

U.S. Pat. No. 3,428,599 to Newing teaches prevention of premature gelation of organopolysiloxanes by controlling the acidity of the polymers during a precuring step with a silazane such as hexamethyldisilazane.

U.S. Pat. No. 3,474,070 to Levene discloses a process for hydrolyzing organotrialkoxysilanes at neutral conditions using an ion-containing hydrolysis catalyst, such as ferric alkoxide or a ferric chelate.

U.S. Pat. No. 3,479,316 to Levine describes a process for hydrolyzing trialkoxysilanes at neutral conditions using a vanadium-containing hydrolysis catalyst such as trialkylvanadate.

U.S. Pat. Nos. 3,868,343 and 3,935,346, both issued to Tillman et al, describe preparation of a coating composition and use of the composition in which such composition contains cure promoting amounts of methanol and lower alkyl alcohol-melamine-formaldehyde partial condensate reaction products which are added to organopolysiloxanes made from methyltrialkoxysilane.

SUMMARY OF THE INVENTION

An object of the present invention is to provide a process for preparing organopolysiloxanes from trialkoxysilanes and the resulting products, in which such products have improved abrasion and solvent resistance and substantially lengthened shelf life, as compared with other organopolysiloxanes formed by hydrolyzing and condensing trialkoxysilanes. A related object is to provide coating compositions of organopolysiloxanes of improved abrasion and solvent resistance for coating various substrates, including those of resinous plastic bodies. A further object is to catalyze hydrolysis-condensation of trialkoxysilanes by a highly acidic aqueous solution and to catalyze cross-linking of the resulting organopolysiloxanes by a hydrocarbyl substituted ammonium hydroxide.

In one form, the process comprises hydrolyzing a trialkoxysilane in acidic aqueous solution containing at least the stoichiometric amount of water required for complete hydrolysis of the trialkoxysilane, and formic acid at a strength greater than 700 parts per million ppm. After hydrolysis, the hydrolyzed silane is condensed as by heating to form the organopolysiloxane.

At any time after condensation has started and before the organopolysiloxane has completely set in a hardened form, the cross-linking catalyst comprising a hydrocarbyl substituted ammonium hydroxide may be added to the reaction mixture. The cross-linking catalyst has been found to produce the desired results only when used in conjunction with formic acid. The hydrocarbyl-substituted ammonium hydroxide catalyst is believed to so promote cross-linking that under the conditions described an organopolysiloxane in thermoset form is obtained having improved abrasion and solvent resistance due to a high degree of cross-linking.

In general, each of the trialkoxy substituents of the silane may contain one carbon atom to about six carbon atoms, while the remaining substituent may be alkyl of one to about six carbon atoms or phenyl.

The amount of water present in the reaction mixture can affect physical properties of the resulting organopolysiloxanes. As a rule, the molar ratio of the water and trialkoxysilane is within the range of about 1.5:1 to about 10:1, respectively. The hydrolyzed silane can be condensed to an organopolysiloxane by heating the reaction mixture, such as at a temperature within the range of about 40° C. to about 300° C. for about one hour to about 10 hours. Unexpectedly, the formic acid in the aqueous reaction mixture can be at relatively high concentrations, for example, greater than 700 ppm to as much as 80,000 ppm and even higher.

The organopolysiloxane products of the invention can, if desired, be molded as solid, integral castings. However, due to their increased abrasion and solvent resistance, the organopolysiloxanes find especially useful application as coatings for substrates, particularly substrates of other resinous plastic bodies. Using the dual catalysts as described, the hydrolyzed silanes can be directly condensed to the organopolysiloxanes desired, or the hydrolyzed silanes can be partially condensed and concentrated to a precure organopolysiloxane which is capable of further cure. Such an organopolysiloxane may be applied still in solution to a point of use and then finally cured to a thermoset, cross-linked condition.

DESCRIPTION OF THE PREFERRED EMBODIMENTS

In general, the present organopolysiloxanes are prepared by hydrolysis of a trialkoxysilane in an aqueous solution which contains at least the stoichiometric amount of water required for complete hydrolysis of the silane. It has been discovered that much higher acid concentrations can be used in the initial hydrolysis reaction than heretofore thought possible as long as the acid that is used is formic. Therefore, in accordance with the present invention, the trialkoxysilane reaction mixture contains formic acid in relatively large concentrations previously regarded as inoperative, for example, greater than 700 ppm.

Following hydrolysis, the hydrolyzed silane is condensed to form the organopolysiloxane. During this time, a catalytic amount of the hydrocarbyl substituted ammonium hydroxide may be present as a cross-linking catalyst to promote the cross-linking reaction and assure realization of an appreciably cross-linked, thermoset organopolysiloxane product. The presence of the cross-linking catalyst has also been found substantially to increase the pot life of the yet curable, cross-linkable organopolysiloxane. Because of their increased abrasion and solvent resistance as well as increased hardness, the resulting organopolysiloxanes make excellent coating compositions.

The various components of the reaction mixture are discussed together with preferred process steps in the hydrolysis and condensation of the trialkoxysilanes. Examples describe a preferred use of the resulting organopolysiloxanes as coatings and the increased abrasion resistance and shelf life inherent in organopolysiloxanes prepared as herein described and claimed.

Trialkoxysilanes useful in the present invention include but are not restricted to those corresponding to the formula:

$$RSi(OR_1)_3 \qquad (1)$$

in which preferably R is alkyl from one to about six carbon atoms and phenyl, and $R_1$ is alkyl from one to about six carbon atoms. As used here and in the claims, "alkyl" is taken to include alkyl, isoalkyl and cycloalkyl.

When R and $R_1$ are alkyl, they may be the same or different and include methyl, ethyl, propyl, isopropyl, butyl, isobutyl, pentyl, isopentyl, hexyl, isohexyl, cyclohexyl and the like. Specific examples include methyltrimethoxysilane, methyltriethoxysilane, methyltri-n-propoxysilane, methyltriisopropoxysilane, (1, 1-dimethylethyl) tripropoxysilane, methyltributoxysilane, hexyltriethoxysilane, phenyltrimethoxysilane, phenyltriethoxysilane, and the like. It is understood that mixtures of the defined trialkoxysilanes can be used. The preferred silane is methyltrimethoxy silane.

The use of formic acid is essential to the invention. If one employs even the next high homolog, namely, acetic acid, the results are similar to that using other acids, such as hydrochloric acid. It further appears that the use of the higher concentrations of formic acid expands the type of trialkoxysilanes that can be used. The non-alkoxy substituent can be alkyl containing as many as six carbon atoms and include as well phenyl. The alkoxy substituent, likewise, can be increased from the maximum of three carbon atoms formerly thought operable to as many as six carbon atoms.

Using methyltrialkoxysilane as an example, hydrolysis of a trialkoxysilane can be represented as:

$$CH_3Si(OR_1)_3 + 3H_2O = CH_3Si(OH)_3 + 3R_1OH \qquad (2)$$

$$nCH_3Si(OH)_3 = (CH_3SiO_{1.5})_n + 1.5nH_2O \qquad (3)$$

or overall $$nCH_3Si(OR_1)_3 + 1.5nH_2O = (CH_3SiO_{1.5})_n + 3n\text{-}R_1OH \qquad (4)$$

in which $R_1$ is as previously defined in Formula 1, and n represents a number corresponding to the degree of polymerization and is greater than one.

The concentration of water in the reaction mixture for the initial hydrolysis reaction should be at least the stoichiometric amount required for complete hydrolysis of the silane. As indicated by Equation 4, the minimum amout is 1.5 mole of water per mole of silane. Organopolysiloxane resins can be prepared at this water concentration. But a smaller water content in the reaction mixture leads to polymers that are rubbery and soft, presumably due to incomplete hydrolysis which leaves residual alkoxy groups in the partial condensation product. The molar ratio of water to silane can be as high as 10. However, if the water to silane molar ratio is in the range of about 1.5 to about 5, the alkanol by-product formed during hydrolysis acts as a solvent for the other products and reactants, and the initially heterogenous reaction mixture becomes clear and homogeneous. This homogeneity allows more uniform control of resin formation.

If the water to silane molar ratio is within the range of 5:1 to 10:1, useful polysiloxanes are still obtained, but the alkanol formed is insufficient to convert the aqueous medium to a solvent for the reactants and products. In this case it is possible that resin precipitation can occur. However, insolubility of resinous products at such higher water concentrations can be overcome by adding a water-miscible organic solvent such as ethanol, propanol, etc. At water concentrations above about 10 moles of water per mole of silane, gel formation can occur even if sufficient organic solvent is added to make the reaction mixture homogeneous.

The exact upper limit of the water to silane molar ratio depends upon such factors as the exact silanes used, time and temperature, and the like. Accordingly, it is not possible to set forth precisely the upper limit, but it can be determined by simple trial and error tests in each case. The molar ratios within which no addition of organic solvent is required, such as from about 1.5 to about 5 moles of water per mole of silane, are preferred.

While it was previously considered essential to maintain the acidity of the initial hydrolysis-condensation reaction mixture within certain limits to avoid gelation and effect polysiloxane formation at a conveniently rapid rate, it has now been discovered that acid pH hydrolysis and condensation of a trialkoxysilane can be effected at considerably higher acid concentrations than thought possible as long as the acid that is used is formic. Concentrations higher than 700 ppm are useful up to concentrations in excess of 80,000 ppm. Concentrations of formic acid of 300,000 ppm have been successfully used. However, a desirable range of formic acid concentration is about 750 ppm to about 80,000 ppm. The shelf life of organopolysiloxanes formed from formic acid concentrations above 80,000 ppm begins to decline. A preferred acid concentration range is about 2,400 ppm to about 4,800 ppm.

The value of the formic acid concentration in parts per million can be determined as follows. To 25 ml. of toluene, 13 drops of a 0.04% methanol solution of bromcresol purple were added and the resultant mixture then titrated to a blue-violet endpoint with 0.02 N potassium hydroxide. A 10.0 ml. sample of methyltrialkoxysilane was pipetted into the solution so obtained and the mixture titrated to the same blue-violet endpoint with 0.02 N potassium hydroxide. The weight of a 10 ml. sample was independently determined. Under these conditions, acidity is calculated as $$A = 729V/S$$

where A is acid content in parts by weight (grams) of formic acid per million parts by weight (grams) of methyltrialkoxysilane (assuming that the entire sample is the silane), V is the volume of alkali used in the second titration described, and S is the weight of the sample in grams.

The initial hydrolysis-condensation reaction may be carried out by placing in a suitable vessel pure water, the trialkoxysilane, the formic acid in an amount greater than 700 ppm. The resulting mixture is then heated under reflux. The initially cloudy reaction mixture clears on heating, usually within an hour, because the alcohol formed as a hydrolysis by-product dissolves the other components of the mixture. A suitable degree of hydrolysis-condensation is usually obtained if reflux is allowed to proceed for about one hour to about four hours after the mixture has cleared. This step can be carried out at temperatures lower than reflux, but the rate is slower.

Following hydrolysis of the silane to form a silanetriol, the latter is converted to an organopolysiloxane. This can be accomplished in general by heating the reaction mixture represented by the aqueous solution at a temperature from about 40° C. to about 300° C. for about one hour to about 10 hours, and preferably from about 70° C. to about 150° C. for about two to four hours. However, in practice, it is preferred to obtain the organopolysiloxane by a procedure within the stated temperature and time ranges which embodies concentrating the aqueous solution with attendant removal of by-products.

For example, after hydrolyzing the silane, the aqueous solution may be heated gradually to a final temperature of about 65° C. to about 300° C. and preferably from about 70° C. to about 150° C., while gradually removing by volatilization alkanol by-products and some water. As an instance, the volatilization and removal of alkanol by-products and water may take place with continuing condensation and heating within the range of about 70° C. to about 300° C., and preferably from about 90° C. to about 220° C., for a time short of solid or gel formation in the indicated temperature ranges.

The reaction mixture from the initial hydrolysis-condensation is concentrated by removing volatile components by distillation as from the vessel containing it. All of the solvents, such as water and by-product alkanol, should not be removed, or the resin will have a tendency to gel. Usually removal of about 80 mole percent of the alkanol by-product provides a residue convenient to manipulate further as herein described. The concentrate so obtained may be further heated, conveniently while stirring in an open vessel. The elimination of water and other volatile materials from the reaction mixture at this point presumably leads to further polymerization, and the mixture becomes increasingly viscous.

Another significant aspect of the present invention is the use of a hydrocarbyl substituted ammonium hydroxide to catalyze the cross-linking of the organopolysiloxane produced by condensing the silanetriol. The conjoint use of formic acid and the hydrocarbyl substituted ammonium hydroxide truly produces a synergistic result in that the organopolysiloxane obtained has properties which are not obtained when either the formic acid or the hydrocarbyl substituted ammonium hydroxide is used alone. Further, the use of a hydrocarbyl substituted ammonium hydroxide with other acidic catalysts in total substitution of formic acid, such as hydrochloric acid, likewise fails to produce the improved cross-linked, thermoset organopolysiloxanes of the present invention.

The hydrocarbyl substituent preferably is selected from alkyl, isoalkyl, and cycloalkyl up to about six carbon atoms, and more preferably up to about four carbon atoms, and from alkenyl, isoalkenyl, and cycloalkenyl up to about six carbon atoms, and more preferably up to about four carbon atoms. Also, in the preferred practice, the cross-linking catalyst is a tetrahydrocarbyl substituted ammonium hydroxide. The preferred hydrocarbyl substituted ammonium hydroxide is tetramethyl ammonium hydroxide. The alkenyl substituents are preferably present when relatively low concentrations of the substituted hydroxide are used.

The minimum amount of ammonium hydroxide that is added is not critical, since any addition affords some improvement in accordance with the invention. However, the maximum amount of substituted ammonium hydroxide that is added preferably is insufficient to neutralize all of the formic acid present, because an acid environment is desirable to continue solution stability against gelation. As a rule, the amount of substituted ammonium hydroxide used ranges from about 0.01% to about 1.5% by weight of the organopolysiloxane. A preferred range is about 0.3% to about 0.75%. As indicated, the greater amounts of the substituted hydroxide are preferably used with greater formic acid concentrations so that complete neutralization of the acid does not take place.

When the substituted ammonium hydroxide is to be incorporated into the reaction mixture, it is preferably initially dissolved in a non-reactive organic solvent and the resulting solution of the hydroxide then added to the mixture. If the substituted hydroxide were added directly to the reaction mixture, it could cause local gelation and the properties of the resulting organopolysiloxane resinous products are not as outstanding.

Any organic liquid that dissolves the substituted ammonium hydroxide and the intermediate, partially cured, curable organopolysiloxane and is non-reactive with the components of the reaction mixture can be used. The solvent is ultimately removed in any event. Lower alkyl alcohols are preferred, such as alkyl alcohols up to about five carbon atoms. Butyl alcohol is especially preferred. Aromatic solvents can also be used, such as benzene, xylene, and toulene, although the substituted ammonium hydroxide and organopolysiloxane resins are not as soluble in such solvents. Mixtures of alkyl alcohols and aromatic solvents can be used in this event such as on a 50-50 weight ratio.

This use of a highly basic hydrocarbyl substituted ammonium hydroxide catalyst in conjunction with formic acid greatly improves the abrasion and solvent resistance of the organopolysiloxane resins produced. At the same time, the pot life of the partially cured organopolysiloxanes is also commercially acceptable.

Reverting to a discussion of the treatment of the reaction mixture which may now, in accordance with the present invention, contain the hydrocarbyl substituted ammonium hydroxide, at pressures near one atmosphere temperatures within the range of about 40° C. to the reflux temperature of the mixture are useful in promoting further reaction.

Temperatures much below this range require substantially longer times for reaction, but they are operable. For example, temperatures as low as 20° C. may be used when the time of reaction may be as much as ten hours or more. In general, temperatures at or near the reflux temperature of the reaction mixture are preferred.

As evidenced by Equations 2 and 4, some alkanol by-product is retained in the reaction mixture during initial hydrolysis and condensation. It is believed that the alkanol slows the overall rate of hydrolysis and thereby the condensation rate as well. This control of the rate of resin formation prevents premature gelling and allows the preparation of highly cross-linked polymers with good dimensional stability. If the by-product alkanol concentration is allowed to fall substantially below 1.5 moles of alkanol per mole of silane monomer (assuming complete hydrolysis of the silane), gel formation occurs. This limit can vary slightly with the particular conditions and materials used.

As indicated, the described heating of the reaction mixture to a temperature above its initial reaction temperature to a maximum temperature, such as within the range of about 65° C. to about 300° C., removes some but not all volatile material including the alkanol by-product, the solvent for the substituted ammonium hydroxide when present, and water. This procedure can be interrupted to obtain a liquid residue, or it can be carried to completion to form a hardened, thermoset organopolysiloxane. When the condensation is interrupted short of complete cure while still leaving a liquid resin or liquid organopolysiloxane, the heating step is of the nature of a precure heating step. The purpose of precure is to effect controlled removal of the remaining volatiles while siloxane condensation continues at a convenient rate but slowly enough to avoid gel formation. As used here and in the claims, terms like "liquid siloxane partial condensation product," "liquid organopolysiloxane," "liquid resin," and the like are intended to include compositions obtained during a precure step which are still in a liquid or solution state. For example, the precure resinous products may be in solution in a mixture of water and a by-product alkanol, with or without other added solvent, or the precure resinous products may be dissolved n a single organic solvent or a mixture of organic solvents which may be miscible or immiscible with water.

Precuring can be carried out such that the product is a liquid, organic solvent-soluble, organopolysiloxane suitable for use as, for instance, a casting resin, or as a coating, potting, adhesive or similar composition, or as a component or such compositions. Alternatively, precuring of the liquid siloxane partial condensation product can be continued to a point where, upon cooling, a solid, heat-softenable, solvent soluble siloxane partial condensation product is obtained which can be converted upon further curing, as by heating, from a thermosetting organopolysiloxane resin to one that is substantially fully cured or thermoset. For instance, such a solid, thermosetting, organopolysiloxane resin can be obtained as an intermediate product during the low-temperature curing of a concentrated liquid siloxane partial condensation product that has been cast into a mold.

In use, therefore, hydolysis and condensation of the trialkoxysilane can take place as one continuous operation as when the aqueous reaction mixture of the silane is applied to a point of use, and the condensation reaction continued until a thermoset, resinous organopolysiloxane is obtained. Or, the condensation reaction can be interrupted to form any of the precure reaction products which, themselves, are later applied to a point of use and condensation continued until a desired end product is obtained. In the precure reaction products, the partial siloxane condensation product does not usually exceed 90 weight percent of the solution. The finally cured products are substantially solid and possess a high degree of cross-linking.

Although the present organopolysiloxanes may be molded as castings, they are preferably employed as coatings for substrates where scratch and mar resistance are especially desirable. Any suitable substrate can be used including metals such a metal sheets or electroconducting wire, but substrates of resinous plastic bodies are especially useful. Good results, for example, are obtained with coating polycarbonates which normaly scratch quite easily.

Exemplary of the organic polymeric substrates which may be coated with special advantage by the present invention are the solid polycarbonates, including both polyalkyl carbonates and polyaryl carbonates, the solid polysulfones, and the solid acrylics. Other plastics include solid epoxy materials, polystyrene, vinyl polymers and copolymers, polyesters, polyamides, acrylonitrile polymers and copolymers, polyethylene, and the like. By means of the present invention, such organic substrates are subjected to a relatively shorter and lower time-temperature conditions in curing the organopolysiloxanes than would be the case without the described catalysts.

The organopolysiloxanes may also be applied to optical glass, including window glass, and thereby enable the coated glass to be washed and cleaned without abrading the glass itself. When used as a coating, a reaction mixture may be applied by spraying, dipping, flow coating, roller coating, and the like. The thickness of the coating can be controlled by varying the concentration of the resin solution and/or the number of coatings applied.

Variations in the procedures for the preparation of the organopolysiloxanes can be carried out by individually hydrolyzing two or more different hydrolyzable silanes and then condensing them together. For example, it is possible to hydrolyze individually a methyl trialkoxysilane and a phenyl trialkoxysilane, and then combine the resulting products to form a reaction mixture that is further processed as herein described. The resulting co-condensation product ultimately yields when fully cured a solid, organopolysiloxane body.

As a further modification of the invention, improved resins can still be obtained when the present dual catalysts of formic acid and hydrocarbyl substituted ammonium hydroxide are used in addition to, and usually subsequently to, other acids employed to catalyze the hydrolysis and condensation of a silane. For example, should a mineral acid like hydrochloric, sulfuric, nitric, etc., be used as a condensation catalyst, formic acid and the hydrocarbyl substituted ammonium hydroxide can still be added as herein described to the condensate and contribute to improved properties of the resulting organopolysiloxane. This technique is especially useful in prolonging the shelf life of a curable organopolysiloxane that has been catalyzed by other acids.

It is understood that various additives can be incorporated into the polysiloxane resinous products, such as those which are substantially chemically inert under the reaction conditions. Such additives include filler materials like silica, alumina, diatomaceous earth, clays like kaolin, bentonite, etc., coloring agents like alcohol or water-soluble dyes or insoluble pigments, opacifiers, plasticizers, and the like.

The following examples only illustrate the invention and should not be construed as imposing limitations on the claims.

EXAMPLES 1 THROUGH 8

In order to render the results comparable, the trialkoxysilane used in all examples was either methyltrimethoxy silane or methyltriethoxy silane, and the hydrocarbyl substituted ammonium hydroxide was tetramethyl ammonium hydroxide. The procedure employed in preparing the organopolysiloxanes was likewise the same, except for acid concentration, catalyst used, temperature and time of cure, and the like, all of which are noted in the following Table A.

For each example, a reaction mixture was prepared comprising 136 grams of the trialkoxy silane, pure water in an amount completely to hydrolyze the silane, and a catalyst of the type and in the amount indicated in Table A. The reaction mixture was heated in a reaction flask with stirring until it cleared. The mixture was held at reflux conditions for four hours, while 50% of the alcohol resulting from hydrolysis was removed by distillation.

Thereafter, the reaction mixture was subjected to a uniform precure heat. This was followed by a cure at 135° C. for a time indicated by Table A to a fully cured state. A Bayer Adhesion Test and shelf life test were carried out on each sample.

The Bayer Adhesion Test determines the relative resistance of a transparent coating to surface abrasion using oscillating quartz sand as the abrading medium. The thickness or height of the sand which rests on top of the test specimen remains constant during the reciprocable motion of a cradle which passes over the specimen. Therefore, the average pressure on the surface under test also remains constant, giving highly reproducible results over the entire surface of the test specimen. The stroke velocity is chosen in such a way that the sand remains almost at rest because of its inertia. Accordingly, the relative motion between sand and the specimen is large. The degree of abrasion is measured by the amount of chaange in the luminous transmission and resulting haze before and after exposure to the test. The haze is a measure of cloudiness obtained by a standard optical instrument.

The test apparatus consists of a specimen holder, sand cradle, drive mechanism, and a counter to count the number of strokes. In the present examples, the specimen was a square plate of solid polycarbonate resin measuring four inches on a side and having both sides substantially plane and parallel. Thickness of the plate is not critical. Likewise the thickness of a coating of the test organopolysiloxane on the plate is not critical as long as the coating is continuous. A head of 0.5 inch of sand bore against the specimen. A drive mechanism provided 300 strokes of the sand cradle in one minute.

An integrating sphere photoelectric photometer, described in ASTM Method D 1003, Tests For Haze And Luminous Transmittance of Transparent Plastics, was used to measure the light scattered by the abraded surface after each test run. This was accomplished by taking the specimen from the holder, removing the surface dust by a light filtered air blast, washing and rinsing the abraded surface with distilled water, then air drying, and finally checking the test specimen with the photoelectric, integrating sphere photometer. The photometer provided the percentage of transmitted light and the percent of haze. In Table A, the percent of haze is indicated as a delta value, that is, an increment in percent of haze caused by the abrasion test. This increase in haze, referred to on a percent basis is a measure of the resistance of the coating to abrasion. This percentage value is taken in comparison with a standard having a zero rating. The lower the value for the incremental percent haze, the better the resistance to abrasion.

Shelf life is the time the uncured, curable polysiloxane wthstood room temperatures before gelation occurred.

Table A summarizes the results of nine examples. In this table, the amount of melamine-formaldehyde used as a catalyst is by weight of the silane. The tetramethyl ammonium hydroxide was dissolved in butyl alcohol in an amount to provide the weight indicated of the hydroxide per 100 grams of silane.

The specimen of Example 1 was an uncoated polycarbonate body and had a very high Bayer Abrasion Test value of 43.21 percent increase or increment in percent haze after 300 cycles. Although the test specimens of Examples 2, 3 and 4, using melamine-formaldehyde as the catalyst, had an indefinite shelf life, they also had poor values for abrasion resistance. No substituted ammonium hydroxide was present in these examples.

The specimens of Examples 5 and 6 had the same amount of a substituted ammonium hydroxide, but only Example 6 contained formic acid. Both specimens of these examples had comparative abrasion resistance. But the organopolysiloxane of Example 5 had a shelf life of only 2 to 3 hours, while that of Example 6 had a shelf life greater than a year.

TABLE A
SHELF LIFE AND BAYER ABRASION RESISTANCE TESTS OF ORGANOPOLYSILOXANE COATINGS

| Example | Silane Reactant | Catalyst | Shelf Life | Final Cure | Bayer Adhesion Test 300 Cycles Percent Haze |
|---|---|---|---|---|---|
| 1 | None (bare polycarbonate substrate) | — | — | — | 43.2 |
| 2 | Methyltriethoxysilane | 10% of melamineformaldehyde | Indefinite | 2 hrs @ 135° C. | 25.4 |
| 3 | Methyltrimethoxysilane and formic acid (600 ppm.) | 10% Melamine-formaldehyde | Indefinite | 2 hrs @ 135° C. | 21.0 |
| 4 | Methyltrimethoxysilane and formic acid (1200 ppm) | 10% Melamine-formaldehyde | Indefinite | 2 hrs @ 135° C. | 12.1 |
| 5 | Methyltriethoxysilane | 0.02 gr. Tetramethylammonium hydroxide | 2 to 3 hrs. | 2 hrs @ 135° C. | 8.5 |
| 6 | Methyltrimethoxysilane and formic acid (2400 ppm) | 0.02 gr. Tetramethyl ammonium hydroxide | >12 months | 2 hrs @ 135° C. | 8.5 |
| 7 | Methyltriethoxysilane | 0.2 gr. Tetramethyl ammonium hydroxide | 5 to 6 minutes | 0.5 hr @ 135° C. | (Pencil Hardness 8H) |
| 8 | Methyltrimethoxysilane and formic acid (2400 ppm) | 0.2 gr. Tetramethyl ammonium hydroxide | >6 months | 1 hr. @ 135° C. | 2 to 4 |
| 9 | Methyltriethoxysilane with HCl (5ppm); Formic acid (2400 ppm) added after partial condensation. | 0.1 gr. Tetramethyl ammonium hydroxide | 2 to 3 months | 2 hrs @ 135° C. | 5 to 6 |

The strength of the substituted ammonium hydroxide was increased in Examples 7 and 8 as compared to Examples 5 and 6. Only Example 8 contained formic acid. Again the shelf life differed substantially. Example 7 had a shelf life of only 5 to 6 minutes, while the specimen of Example 8 had a shelf life greater than six months.

Example 9 illustrates that a silane can be conventionally condensed with hydrochloric acid as the catalyst and that formic acid and a substituted ammonium hydroxide can still be added in accordance with the present invention. The resin of Example 9 was prepared with five ppm of hydrochloric acid and later formic acid and tetramethyl ammonium hydroxide were added in the amounts indicated. The shelf life of the organopolysiloxane was still appreciably prolonged, in this instance to less than 3 months. The Bayer Abrasion Test value of a specimen having the cured resin as a coating was also quite attractive at a percent haze increase on only 5 to 6 percent.

Shelf life is very important commercially. A relatively long shelf life enables the product to be packaged and shipped to a point of use and then even stored, if desired, until needed for coating, casting, molding or otherwise shaping and curing of the resinous product into a final solid thermoset state.

The conjoint use of formic acid and hydrocarbyl substituted ammonium hydroxide in the condensation and polymerization of an organopolysiloxane to a thermoset state provides excellent abrasion resistance in the final product as well as affords prolonged shelf life of the partially cured, curable polysiloxane prior to reaching the thermoset state.

Although the foregoing describes several embodiments of the present invention, it is understood that the invention may be practiced in still other forms within the scope of the following claims.

We claim:

1. In a process for preparing an organopolysiloxane by hydrolyzing a trialkoxysilane in aqueous solution containing at least the stoichiometric amount of water required for said hydrolysis, condensing the hydrolyzed silane to an organopolysiloxane, and then cross-linking the oganopolysiloxane; the improvements comprising catalyzing at least some of said condensation by formic acid present in said solution at a strength greater than 700 ppm, and catalyzing cross-linking of said organopolysiloxane by a hydrocarbyl substituted ammonium hydroxide, said hydrocarbyl substituent being selected from alkyl, isoalkyl, and cycloalkyl up to about six carbon atoms, and from alkenyl, isoalkenyl, and cycloalkenyl up to about six carbon atoms.

2. The process of claim 1 in which any alkoxy substituent of said trialkoxysilane contains from one to about six carbon atoms.

3. The process of claim 1 in which said trialkoxysilane is selected from the group consisting of alkyl trialkoxysilane, in which said alkyl group contains from one to about six carbon atoms, and phenyl trialkoxysilane.

4. The process of claim 1 in which said trialkoxysilane corresponds to the formula:

$RSi(OR_1)_3$ in which R is alkyl from one to about six carbon atoms and phenyl, and $R_1$ is alkyl from one to about six carbon atoms.

5. The process of claim 1 in which the molar ratio of said water to said trialkoxysilane is within the range of about 1.5:1 to about 10:1, respectively.

6. The process of claim 1 including heating the solution at a temperature within the range of about 40° C. to about 300° C. for about one hour to about 10 hours to effect said condensation of the silane and cross-linking of the organopolysiloxane.

7. The process of claim 1 in which said formic acid is present in an amount within the range of about 750 ppm to about 80,000 ppm.

8. The process of claim 1 in which said formic acid is present in an amount within the range of about 750 ppm to about 45,500 ppm.

9. The process of claim 1 in which said formic acid is present in an amount within the range of about 2,400 ppm to about 4,800 ppm.

10. The process of claim 1 in which said hydrocarbyl substituent has up to about four carbon atoms.

11. The process of claim 1 in which said cross-linking catalyst is a tetraalkyl ammonium hydroxide.

12. The process of claim 1 in which said cross-linking catalyst is tetraalkyl ammonium hydroxide, said alkyl substituent having up to about four carbon atoms.

13. The process of claim 1 in which said cross-linking catalyst is tetramethyl ammonium hydroxide.

14. The process of claim 1 including coating a substrate with said solution any time prior to complete cross-linking of said organopolysiloxane, and then heating to form a coating of said cross-linked polysiloxane on said substrate.

15. The process of claim 14 in which said substrate is a resinous plastic body of polycarbonate.

16. The process of claim 1 in which said condensation of said hydrolyzed silane is also carried out by a mineral acid.

17. A process for preparing at relatively high acid concentration without premature gelation an organopolysiloxane having increased abrasion resistance, comprising:

(a) hydrolyzing in aqueous solution a trialkoxy silane corresponding to the formula $RSi(OR_1)_3$ 

in which R is alkyl from one to about six carbon atoms and phenyl, and $R_1$ may be the same or different and is alkyl from one carbon atom to about six carbon atoms, (b) said aqueous solution having a molar ratio of water to trialkoxysilane within the range of about 1.5:1 to about 5:1, respectively, (c) said aqueous solution containing formic acid in an amount greater than 700 ppm, (d) heating said solution to condense the hydrolyzed silane and form an organo polysiloxane, (e) adding to said aqueous solution a catalytic amount of a tetrahydrocarbyl substituted ammonium hydroxide, said hydrocarbyl substituent being selected from alkyl, isoalkyl, and cycloalkyl up to about four carbon atoms and from alkenyl, isoalkenyl, and cycloalkenyl up to about four carbon atoms, and (f) continuing to heat said solution to cross-link said organopolysiloxane to a thermoset form.

18. The process of claim 17 in which said heating of the solution, including steps d and f, is at a temperature within the range of about 40° C. to about 300° C. for about one hour to about 10 hours.

19. The process of claim 17 in which said formic acid is present in an amount within the range of about 750 ppm to about 80,000 ppm.

20. The process of claim 17 including coating a substrate with said solution any time prior to complete cross-linking of said organopolysiloxane, and then heating to form a coating of said cross-link polysiloxane on said substrate.

21. The process of claim 17 in which the amount of hydrocarbyl substituted ammonium hydroxide added is insufficient to neutralize all of the formic acid present.

22. The process of claim 17 in which said substituted ammonium hydroxide is dissolved in a non-reactive organic solvent, and the resulting solution is added to said aqueous solution.

23. An organopolysiloxane resulting from the process of claim 1.

24. An organopolysiloxane resulting from the process of claim 17.

25. A coating composition of a partially cured organopolysiloxane adapted to be further cured including cross-linking to a solid form, said coating composition comprising:

(a) an organopolysiloxane condensation product capable of further cure resulting from hydrolysis of a trialkoxysilane in aqueous solution, containing at least the stoichiometric amount of water required for said hydrolysis and condensation of the hydrolyzed silane to the organopolysiloxane, (b) formic acid present at a strength greater than 700 ppm, and (c) a catalytic amount of a catalyst to effect cross-linking of the organopolysiloxane to a solid form, said cross-linking catalyst comprising a hydrocarbyl substituted ammonium hydroxide, said hydrocarbyl substituenet being selected from alkyl, isoalkyl, and cycloalkyl up to about six carbon atoms, and from alkenyl, isoalkenyl, and cycloalkenyl up to about six carbon atoms.

26. The coating composition of claim 25 in which said hydrocarbyl substituent has up to about four carbon atoms.

27. The coating composition of claim 25 in which said cross-linking catalyst is tetraalkyl ammonium hydroxide.

28. The coating composition of claim 25 in which said cross-linking catalyst is tetraalkyl ammonium hydroxide, said alkyl substituent having up to about four carbon atoms.

29. The coating composition of claim 25 in which said cross-linking catalyst is tetramethyl ammonium hydroxide.

30. A coating composition of claim 25 in which said solution contains an organic solvent.

31. A coating composition of claim 25 in which said trialkoxysilane corresponds to the formula:

$RSi(OR_1)_3$ 

in which R i alkyl from one to about six carbon atoms and phenyl, and $R_1$ is alkyl from one to about six carbon atoms.

32. A substrate having a coating formed from the coating composition of claim 25.

* * * * *